(12) United States Patent
Niedermeyer et al.

(10) Patent No.: US 12,106,863 B2
(45) Date of Patent: Oct. 1, 2024

(54) DEGASIFICATION SYSTEM FOR A NUCLEAR POWER PLANT AND METHOD FOR DEGASSING A FLOW OF REACTOR COOLANT

(71) Applicant: FRAMATOME GmbH, Erlangen (DE)

(72) Inventors: Jörg Niedermeyer, Wassertrüdingen (DE); Marco Bewer, Oesdorf (DE)

(73) Assignee: FRAMATOME GmbH, Erlangen (DE)

( * ) Notice: Subject to any disclaimer, the term of this patent is extended or adjusted under 35 U.S.C. 154(b) by 402 days.

(21) Appl. No.: 17/609,511

(22) PCT Filed: Jun. 6, 2019

(86) PCT No.: PCT/EP2019/064827
§ 371 (c)(1),
(2) Date: Nov. 8, 2021

(87) PCT Pub. No.: WO2020/244762
PCT Pub. Date: Dec. 10, 2020

(65) Prior Publication Data
US 2022/0230770 A1    Jul. 21, 2022

(51) Int. Cl.
*G21C 19/307*  (2006.01)
*B01D 19/00*  (2006.01)

(52) U.S. Cl.
CPC ....... *G21C 19/307* (2013.01); *B01D 19/0063* (2013.01); *B01D 19/0078* (2013.01)

(58) Field of Classification Search
CPC ............ B01D 19/0063; B01D 19/0078; B01D 19/0005; C01F 1/20; C01F 1/36; C01F 2201/006; Y02E 30/30; G21C 19/307

USPC ............... 95/30, 255, 259, 266; 96/389, 175
See application file for complete search history.

(56) References Cited

U.S. PATENT DOCUMENTS

| 3,789,577 | A | * | 2/1974 | Gramer | G21C 19/307 |
| | | | | | 376/310 |
| 4,225,390 | A | * | 9/1980 | Brown | G21C 19/307 |
| | | | | | 976/DIG. 268 |
| 4,647,425 | A | | 3/1987 | Battaglia et al. | |
| 4,981,304 | A | * | 1/1991 | Bice | F16J 15/008 |
| | | | | | 277/630 |
| 10,718,510 | B2 | | 7/2020 | Bezlepkin et al. | |
| 2003/0111429 | A1 | | 6/2003 | Montalvao et al. | |
| 2009/0044700 | A1 | | 2/2009 | Dietlin et al. | |

(Continued)

FOREIGN PATENT DOCUMENTS

| CN | 201840914 U | 5/2011 |
| CN | 107206292 A | 9/2017 |

(Continued)

OTHER PUBLICATIONS

Corresponding Search Report and Written Opinion for PCT/EP2019/064827. (Dec. 20, 2020).

*Primary Examiner* — Frank M Lawrence, Jr.
(74) *Attorney, Agent, or Firm* — Davidson Kappel LLC

(57) ABSTRACT

A nuclear power plant includes a nuclear reactor and a reactor coolant circuit containing a reactor coolant. The nuclear power plant further includes a degasification system (2) for the reactor coolant. The degasification system (2) is an ultrasonic degasification system comprising a sonotrode cluster (11) with at least one sonotrode (10) arranged in a line of the reactor coolant circuit or in a line which is fluidically connected to the reactor coolant circuit.

14 Claims, 3 Drawing Sheets

(56) References Cited

U.S. PATENT DOCUMENTS

| | | |
|---|---|---|
| 2009/0290676 A1 | 11/2009 | Meintker |
| 2015/0353380 A1 | 12/2015 | Profit et al. |
| 2016/0225470 A1 | 8/2016 | Corpora |
| 2017/0229201 A1 | 8/2017 | Corpora |
| 2019/0217345 A1 | 7/2019 | Arguelles et al. |
| 2023/0411026 A1* | 12/2023 | Benecke ............ B01D 19/0057 |

FOREIGN PATENT DOCUMENTS

| | | |
|---|---|---|
| EP | 2109114 A2 | 10/2009 |
| JP | 3018929 U | 12/1995 |
| JP | H07328316 A | 12/1995 |
| JP | H09299709 A | 11/1997 |
| JP | H10296006 A | 11/1998 |
| JP | H11133182 A | 5/1999 |
| JP | 2001104942 A | 4/2001 |
| JP | 2015087350 A | 5/2015 |
| JP | 20170113616 A | 10/2017 |
| KR | 19910008360 B1 | 10/1991 |
| KR | 20180046700 A | 5/2018 |
| KR | 20180121779 A | 11/2018 |
| RU | 2565650 C1 | 10/2015 |
| RU | 2630893 C1 | 9/2017 |
| SU | 1373415 A1 | 2/1988 |
| WO | WO2011000452 A1 | 1/2011 |
| WO | WO2018011446 A1 | 1/2018 |
| WO | WO2018195265 A1 | 10/2018 |

* cited by examiner

DEGASIFICATION SYSTEM FOR A NUCLEAR POWER PLANT AND METHOD FOR DEGASSING A FLOW OF REACTOR COOLANT

The present disclosure relates to a nuclear power plant comprising a nuclear reactor and a reactor coolant circuit containing a reactor coolant, in particular based on water or similar to water (e.g. light-water or heavy-water), further comprising a degasification system for the reactor coolant. The present disclosure also relates to an according method of degassing a reactor coolant of a nuclear reactor.

BACKGROUND

A nuclear power plant comprises a nuclear reactor and an associated reactor coolant circuit in which a reactor coolant circulates. For various reasons it may be necessary to remove dissolved gases from the liquid reactor coolant. The process is called 'degasification' or 'degassing'. One reason may be the removal of oxygen to avoid corrosion in the enclosing line or piping system. Another reason may be to prepare the nuclear reactor for maintenance such that the amount of radionuclides is as low as necessary in order to reach reactor vessel opening limits.

EP 2 109 114 A2 discloses a nuclear power plant with a degasification system for a reactor coolant. Said degasification system is based on vaporization (with stripping gas applied).

U.S. Pat. No. 4,647,425 A discloses a nuclear power plant with a vacuum degassing apparatus.

US 2016/225470 A1 discloses a nuclear power plant with a membrane-based degassing apparatus.

SUMMARY

These existing degasification systems in nuclear power plants are considered to be expensive, energy-intensive, inefficient, and space-demanding.

Therefore, an objective underlying the present disclosure is to provide a nuclear power plant with a degasification system which can be easily integrated into the surrounding systems with low space-demand, which in the case of existing plants can be adapted to various needs, and which works reliably and efficiently. Furthermore, the present disclosure shall provide an according method for degassing a flow of reactor coolant of a nuclear reactor.

Hence, a nuclear power plant is provided comprising a nuclear reactor and a reactor coolant circuit containing a reactor coolant, further comprising a degasification system for the reactor coolant, wherein the degasification system is an ultrasonic degasification system comprising a sonotrode cluster with at least one sonotrode arranged in a line of the reactor coolant circuit or in a line which is fluidically connected to the reactor coolant circuit, preferably allowing continuous degasification of the reactor coolant.

In an ultrasonic degasification system, the gas dissolved in a liquid forms small cavitation bubbles due to the ultrasonic application of energy. In a separation vessel or tank, the micro bubbles gather into larger bubbles and rise to the surface of the liquid such that the separated gas can be extracted. An ultrasonic oscillator is also called sonotrode.

The present disclosure is based on this known technology, which is commercially available, proven and tested in other industry sectors, and transforms it into a suitable application for degassing a reactor coolant of a nuclear plant. Advantages are, among others: cost and energy-efficient, space-saving, low-maintenance, easy installation and operation, modular design, expandable (scalable) on demand.

In a preferred embodiment the sonotrode cluster comprises a plurality of sonotrodes in parallel-flow configuration. Preferably, the number of flown through (active) sonotrodes is adjustable with the help of according control valves.

For a continuous operation each sonotrode is preferably arranged within a flow-through cell which can be any container, pipe or tank suitable for flow-through operation.

While in principle it is possible to place said sonotrode in the same vessel, tank or pipe in which the gas separation occurs, it is advantageous for the here-described application to have the ultrasonic subsystem and the separation subsystem spatially separated from each other, such that there is a separation vessel downstream of the sonotrode cluster.

Preferably, the separation vessel comprises a gas space to which a suction line for an extracted gas flow is connected. Hence, during operation the gas space is preferably kept under negative pressure with respect to the atmosphere. Gas separation may also be achieved or supported by a purging gas via the separation vessel.

In a preferred embodiment there is a sonotrode cooling system, preferably with a fluid heat transfer medium or coolant circulating inside an open or a closed cooling loop. Additionally or alternatively, in particular in case of bigger clusters of sonotrodes, there is a flow cooling system, preferably of the same kind, for cooling the liquid flow leaving the sonotrodes.

A particular advantageous embodiment relates to a nuclear power plant with a Pressurized Water Reactor (PWR) and with a primary reactor coolant circuit and a secondary reactor cooling circuit, wherein the reactor coolant to be degassed is a primary reactor coolant of the primary reactor coolant circuit. However, degassing a secondary reactor coolant of the secondary reactor coolant circuit is also possible. In this context, the term 'Pressurized Water Reactor' is to be understood in a broad sense which includes light-water reactors such as the European Pressurized (Water) Reactor (EPR) or the German 'Druckwasserreaktor' (DWR), but also heavy-water reactors such as CANDU. The CANDU, for Canada Deuterium Uranium, is a well-known Canadian pressurized heavy-water reactor design.

Usually, access to the primary reactor coolant of the primary reactor coolant circuit is possible via an associated reactor Chemical and Volume Control System (CVCS) comprising a letdown line and a Volume Control Tank. Preferably, a supply line leads from the letdown line to the sonotrode cluster such that a branch flow of the flow through the CVCS control system is treated by the ultrasonic subsystem.

In this case it is particularly useful when the Volume Control Tank is arranged to act as a separation vessel for a flow of primary reactor coolant leaving the sonotrode cluster.

More generally, any liquid within a nuclear power plant may be degassed by an ultrasonic degasification system of the kind described here, for example boric acid and/or demineralized water before injection into the circulating reactor coolant.

With respect to the method, the present disclosure suggests a method for degassing a flow of reactor coolant of a nuclear reactor, the method comprising the following steps:
(a) applying ultrasonic vibrations to the flow with the help of at least one sonotrode, and then
(b) guiding the flow into a separation vessel, wherein a flow of gas is separated from a liquid phase.

Preferably, the steps (a) and (b) are executed continuously.

The device-related remarks above apply to the method analogously.

Briefly summarizing, the system according to the present disclosure is intended and suitable for degasification of a flow of reactor coolant within an auxiliary system connected to the reactor coolant circuit. For better scalability and modularity, a cluster of several sonotrodes in parallel-flow configuration is switched into a main flow line. Further optional components include a cooling device for the sonotrodes and/or the main flow and a depressurized gas separator downstream to the sonotrode arrangement. The whole sonotrode arrangement may be located within a movable container.

BRIEF SUMMARY OF THE DRAWINGS

Exemplary embodiments of the present disclosure are subsequently described with reference to the accompanying drawings.

DETAILED DESCRIPTION

Figure 1:
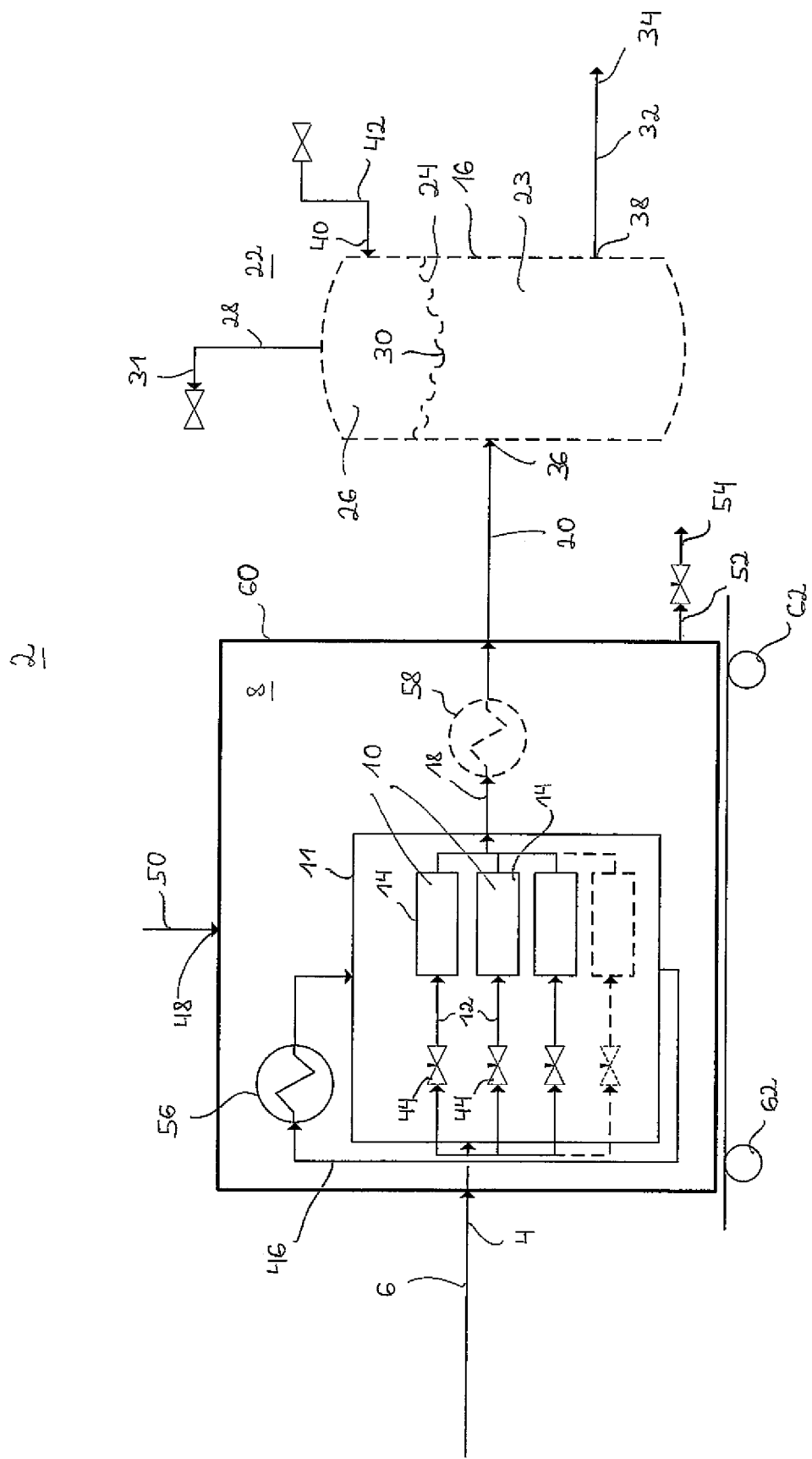
FIG. 1 shows a schematic overview of a degasification system for a gaseous liquid.

Similar technical elements are assigned the same reference numerals throughout the drawings.

FIG. 1 shows a schematic overview of a degasification system 2 for a liquid, that is a liquid containing dissolved gas or vapor. An inflow 4 or stream of liquid to be degassed enters via feed line or pipe or supply line 6 into an ultrasonic subsystem 8 which comprises a cluster of sonotrodes 10, in brief sonotrode cluster 11. More precisely, the supply line 6 branches into a number of parallel branch lines 12 or branches such that during operation the liquid inflow 4 is divided into partial flows or streams accordingly. Each branch line 12 comprises an ultrasonic flow-through cell 14 which comprises a sonotrode 10. In this context, the term 'cell' is meant in a broad sense and includes any container or vessel or tank or pipe which is suited for flow-through operation.

In general, a sonotrode is a device that creates ultrasonic vibrations and applies vibrational energy to a gas, liquid, solid or tissue. A sonotrode usually consists of a stack of piezoelectric transducers attached to a tapering metal rod. The end of the rod is applied to the working material. An alternating current oscillating at ultrasonic frequency is applied by a separate power supply unit to the piezoelectric transducers. The current causes them to expand and contract. Advantageously, the frequency of the current is chosen to be the resonant frequency of the tool, so the entire sonotrode acts as a half-wavelength resonator, vibrating lengthwise with standing waves at its resonant frequency. The standard frequencies used with ultrasonic sonotrodes range from 20 kHz to 70 kHz. Usually, the amplitude of the vibration is small, about 13 to 130 micrometers.

In the context of the present disclosure, each sonotrode 10 applies vibrational energy to the liquid flowing through the according flow-through cell 14. This leads to cavitation, a phenomenon in which rapid changes of pressure in the liquid lead to local vaporization and thus to the formation of small vapor-filled cavities. In other words, the dissolved gas gets entrapped into micro gas bubbles which can easily be separated from the liquid, preferably in a downstream separation vessel 16.

To this end, the branch lines 12 downstream to the flow-through cells 14 are merged into a common collecting line 18 or pipe which, via a connecting line 20 or pipe, leads to a separation subsystem 22. The separation subsystem 22 comprises a separation vessel 16 or tank which is designed to be filled with liquid 23 entering from the connecting line 20 up to a given design filling level 24 during flow-through operation. Above the liquid 23 there is a gas space 26 which during operation is preferably kept at a negative pressure (below atmospheric pressure). This is achieved via an extraction line or suction line 28 attached to the separation vessel 16 in the region of the gas space 26 (an according suction pump is not shown here). This way, the gas bubbles contained in the liquid 23 rise up to surface 30 of the liquid 23 and enter the gas space 26 where the collected gas is withdrawn by suction via suction line 28 as gas flow 31. Hence, the separation vessel 16 acts as a gas separator for the liquid previously treated in the upstream sonotrode cluster 11. The degasified liquid is discharged from the separation vessel 16 via discharge line 32 as liquid outflow 34 or stream.

The connecting line 20 enters the separation vessel 16 preferably in the region below the gas space 26, discharging into the liquid 23 gathered therein. In order to support a high separation efficiency, the inlet opening 36 into the separation vessel 16 is preferably designed to support a tangential inward flow. Similarly, the outlet opening 38 into the discharge line 32 preferably supports a tangential outward flow.

In addition to or alternative to the suction induced by negative pressure, the separated gas gathering in the gas space 26 above the liquid phase may be drawn from the separation vessel 16 by a purging gas flow 40 entering the gas space 26 via an attached purging gas line 42 (purging gas supply not shown here).

Depending on the operating conditions and the objectives of operation some of the sonotrodes 10 may be switched off into a non-active state. It may also be desirable to shut down or to control the liquid flow through the respective flow-through cell 14 with the help of a shut-off valve or control valve 44 in the according branch line 12 of the ultrasonic subsystem 8. Preferably, the control valve 44 is arranged upstream to the flow-through cell 14 comprising the sonotrode 10.

Depending on the system specification and the operating conditions it may be advantageous to provide cooling for the sonotrodes 10. In a preferred embodiment, there is a system of cooling lines 46 integrated into the ultrasonic subsystem 8 and being in thermal contact with the sonotrodes 10, in particular with water as flowing coolant. The coolant is provided at coolant inlet 48 as coolant inflow 50 and discharged at a coolant outlet 52 as coolant outflow 54 after being heated by the waste heat of the sonotrodes 10. Re-cooling of the coolant is preferably provided by an external re-cooling system (not shown here) such that during operation there is a closed cooling circuit. The coolant in the cooling circuit is preferably driven by a coolant pump which may be integrated into the ultrasonic subsystem 8 or alternatively is located externally.

In addition to or alternative to said sonotrode cooling system 56 there may be a flow cooling system 58 for the liquid flow leaving the sonotrodes 10. This flow cooling system 58 is preferably realized as a cooling circuit with a circulating fluid coolant, just like the sonotrode cooling system 56 described in the previous paragraph. Preferably, the cooling circuit comprises a heat exchanger which is in thermal contract with the collecting line 18. Alternatively or additionally, it may be in thermal contact with some of or all the individual branch lines 12 downstream the sonotrodes 10. In particular, the flow cooling system 58 for the liquid outward flow from the sonotrodes 10 may be a part or a branch of or may share common components with the sonotrode cooling system 56.

In summary, during operation of the degasification system 2 a stream or inflow 4 of liquid carrying dissolved gaseous constituents enters the ultrasonic subsystem 8 via supply line 6, is then diverted or distributed into the parallel branch lines 12 and is led through the flow-through cells 14, wherein the sonotrodes 10 cause the formation of small gas bubbles within the liquid. The such-treated liquid from the different branch lines 12 is then collected in the collecting line 18. The resulting liquid flow is led via connecting line 20 to the separation subsystem 22, wherein it is injected into the separation vessel 16. Inside the separation vessel 16 the liquid phase is separated from the gaseous phase. The gaseous phase is drawn as a gas flow 31 from the separation vessel 26 via suction line 28 or another suitable extraction line by suction or with the help of a purging gas flow 40. The degasified liquid outflow 34 leaves the separation vessel 16 via liquid discharge line 32.

During operation the sonotrodes 10 and/or the liquid flow coming from the sonotrodes 10 are preferably cooled by a flow of coolant, preferably water.

The whole system and the according process are preferably designed to operate continuously with a continuous inflow of gaseous liquid and a continuous outflow of gas and degasified liquid. Transport of the liquid is preferably accomplished by a number of pumps which may be integrated into the ultrasonic subsystem 8 and/or be placed elsewhere in the line system which guides the liquid.

A modular construction is achieved by integrating the ultrasonic subsystem 8 into a housing 60 which encloses the flow-through cells 14 and the sonotrodes 10, the branch lines 12 with the according branching and junctions, and—if present—the internal cooling lines 46. Interfaces to the external components and devices of the degasification system 2 include line connectors for the inflow of gaseous liquid, the outflow of degasified liquid, and—if applicable—line connectors for the inflow and outflow of coolant. Alternatively, only the individual flow-through cells 14—each comprising at least one sonotrode 10 and, if applicable, an according cooling system—are placed inside individual housings, whereas the corresponding line branching and junctions are located outside of these individual housings.

The whole ultrasonic subsystem 8 can be designed as mobile device, for example with transport rollers 62, albeit in view of qualification for seismic loads and the like a stationary installation may be advantageous.

The separation subsystem 22 with the separation vessel 16 is preferably arranged as an external facility outside the ultrasonic subsystem 8. In particular, the separation vessel 16 can be an existing component of an existing technical facility. A simple connecting line 20 (e.g. a hose or a pipe) is required to connect the ultrasonic subsystem 8 to the separation subsystem 22. The line connection may be realized as a detachable connection, for example by plug and/or clamping means, or as a permanent connection, for example by welding.

To avoid re-dissolution of the gas bubbles within the liquid outflow from the sonotrodes 10 before it enters the separation vessel 16, the length of the connecting line 20 is preferably chosen to be as short as possible, based on the nominal diameter of the main pipe and the flow rate. The transfer time from the sonotrode 10 into the separation vessel 16 shall be in an order of magnitude of 2 to 3 seconds at maximum.

The number of branch lines 12 and according sonotrodes 10 in the ultrasonic subsystem 8 is chosen according to the demands of the actual application. In special cases a single sonotrode 10 may be sufficient (i.e. the term 'sonotrode cluster' is meant to include the lower limit of just one branch line), while in general a multitude of parallel branch lines 12 and according sonotrodes 10 may be required to handle large volume flows. The related pressure drop in the liquid line is negligible and of no practical concern in most cases.

It is also possible to arrange several of the above-described ultrasonic subsystems 8 in parallel, thereby increasing the number of parallel sonotrode branches accordingly. Similarly, it is possible to arrange several of the separation vessels 16 in parallel if corresponding line branches and junctions are provided.

Redundancy and/or performance enhancements with respect to existing degasification systems, in particular of a different type, can also be achieved by simply providing suitable line branches and junctions.

A corresponding control system may control the individual sonotrodes 10 (in particular the ultrasonic power introduced into the liquid flow), the number of active branches (via the shut-off valves or control valves 44), the cooling capacity (via the flow of coolant, e.g. cooling water), and/or the liquid level inside the separation vessel 16.

Figure 2:
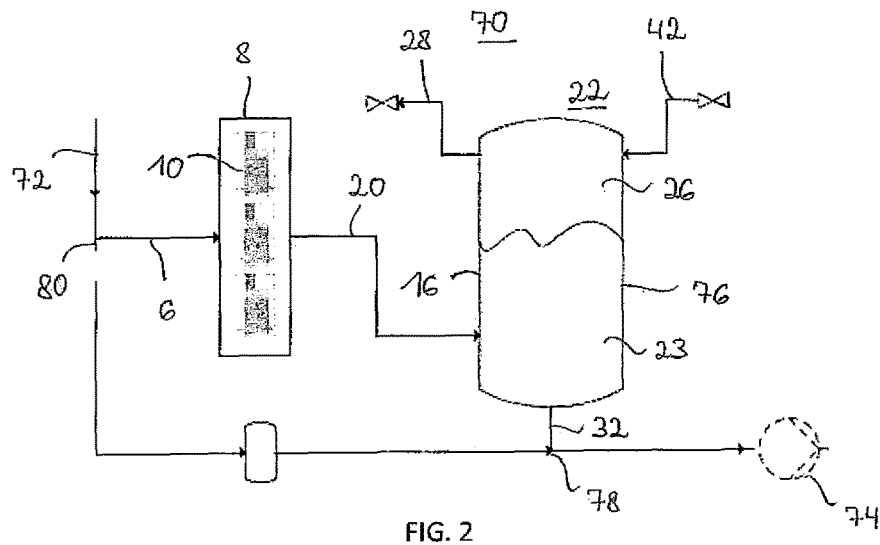
FIG. 2 shows a first concrete application of the degasification system according to FIG. 1 within a nuclear power plant, here for degassing a primary reactor coolant of a pressurized water reactor.

FIG. 2 shows a first concrete application of the above-described concept within a nuclear power plant.

Figure 5:
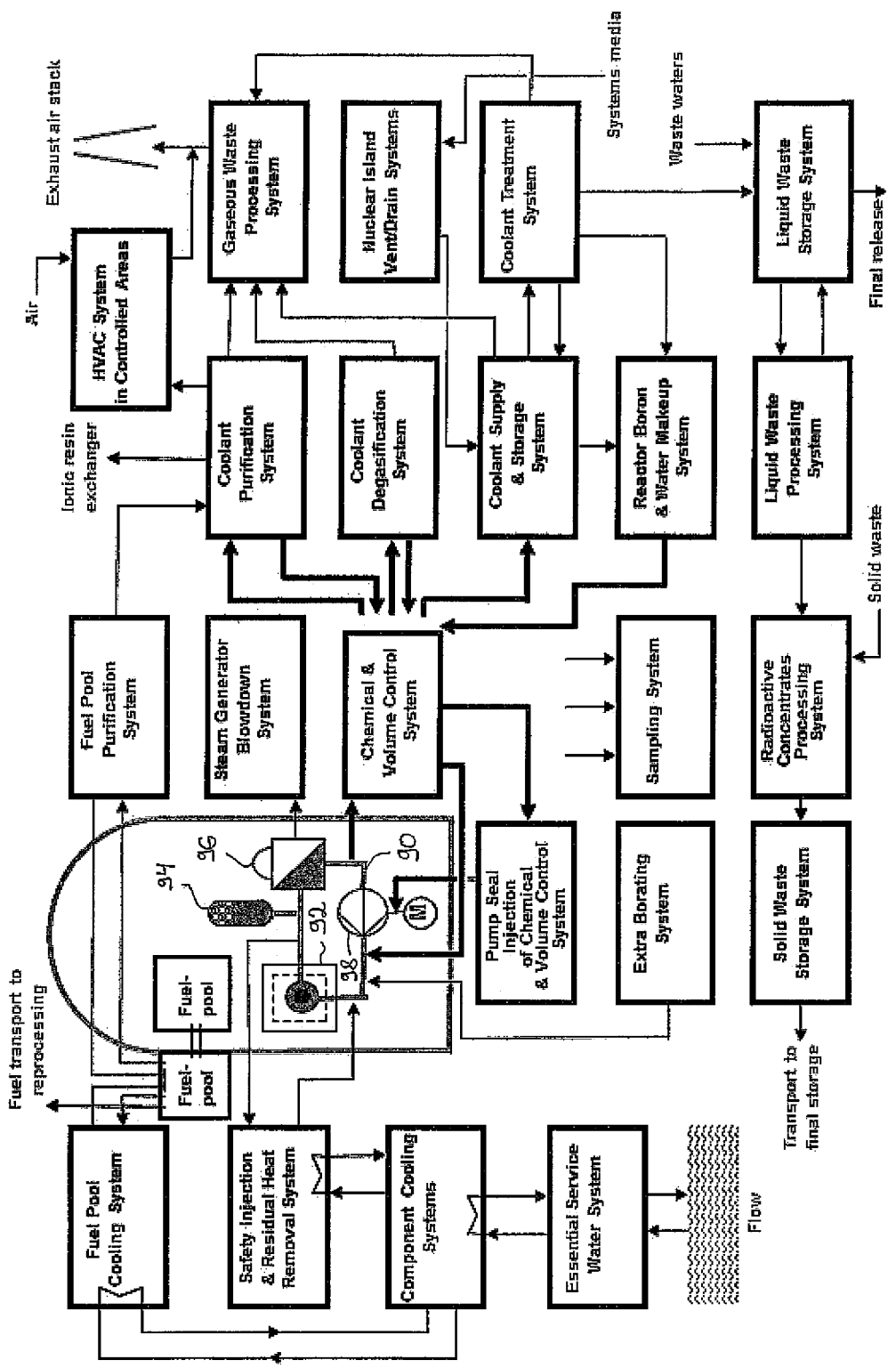
FIG. 5 gives an overview of a Pressurized Water Reactor (PWR) with a primary coolant circuit and related auxiliary systems.

A pressurized water reactor comprises a primary reactor coolant circuit 90 carrying a primary reactor coolant. The primary reactor coolant circuit 90 comprises a Reactor Pressure Vessel (RPV) 92, a pressurizer 94, a steam generator 96, and a primary coolant pump 98. The steam generator 96 provides a thermal connection to the secondary coolant circuit. The volume, the chemical composition, and other physical properties of the circulating primary reactor coolant can be controlled by a Reactor Chemical and Volume control system (CVCS) 70 which is fluidically connected to the primary reactor coolant circuit 90. This is shown schematically in FIG. 5.

Turning back to FIG. 2, the Reactor Chemical and Volume control system (CVCS) 70 comprises a letdown line 72 for the primary reactor coolant which leads to a high-pressure charging pump 74 for re-injecting the primary reactor coolant into the primary reactor coolant circuit. A Volume Control Tank (VCT) 76 is fluidically connected to the letdown line 72 in a line section upstream to the charging pump 74 at a three-way line branching 78.

To support degasification for a branch stream of the primary reactor coolant, an ultrasonic subsystem 8 with a sonotrode cluster 11 of the above-described kind is used. The supply line 6 for the ultrasonic subsystem 8 is fluidically connected on the inlet side to the letdown line 72. The according three-way line branching 80 is arranged upstream to the line branching 78 which connects the VCT 76 to the letdown line 72. Also, the full flow can be routed via this branch. On the outlet side the ultrasonic subsystem 8 is fluidically connected to the VCT 76 via connecting line 20. The connecting line 20 discharges into a lower region of the VCT 76 which during operation normally contains a liquid phase of the primary reactor coolant. Above the liquid phase there is a gas space 26 to which a suction line 28 is connected. The suction line 28 which during operation is kept under negative pressure leading to an exhaust system (not shown). Furthermore, there may be a purging gas line 42 discharging into the gas space 26 of the VCT 76, providing a stripping gas stream to the VCT 76 containing nitrogen or another suitable stripping gas.

Hence, a partial or full stream of the primary reactor coolant stream running through the letdown line 72 is diverted to the ultrasonic subsystem 8 and is then led into the VCT 76 which acts as separation vessel 16 in the above-described sense and manner. From the VCT 76 the degasified volume is led into the letdown line 72 again via a line acting as discharge line 32 and the three-way branching 78. Thus, the ultrasonic subsystem 8 and the VCT 76 constitute a degasification system 2 within the Reactor Chemical and Volume Control System 70 which is able to continuously degasify a branch stream of the primary reactor coolant stream or, depending on the needs, also the full stream.

In order to retrofit such a degasification system 2 into an existing plant, it is—in principle—merely necessary to provide the connections for the ultrasonic subsystem 8, and, if necessary, for the suction line 28 and the purging gas line 42. The ultrasonic subsystem 8 therefore can be treated as a 'black box' system during the planning stage.

In contrast to a conventional degasification system (>2 MW power for a volume flow of 72 m³/h) based on vacuum vaporization, the degasification system according to the present disclosure is much more energy efficient (0.1 MW power for a volume flow of 72 m³/h).

Figure 3:
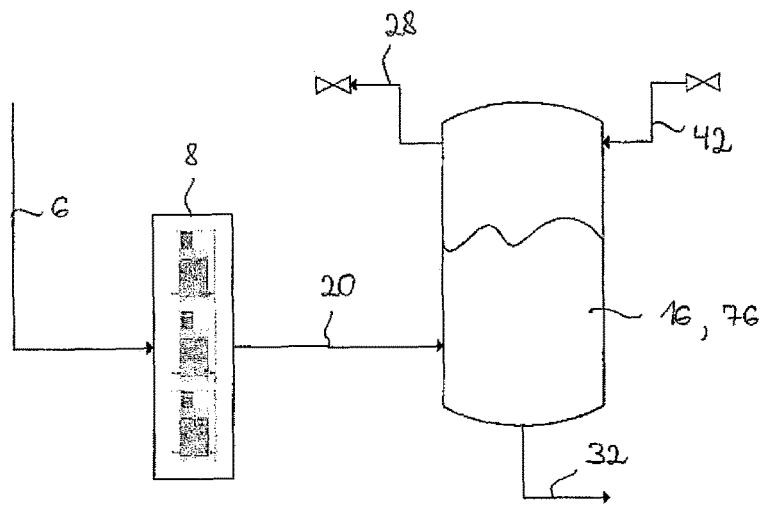
FIG. 3 shows a second concrete application of the degasification system according to FIG. 1.

FIG. 3 shows a second concrete application of the above-described concept within a nuclear power plant. The figure shows the ultrasonic subsystem 8 as cluster in the main stream upstream the Volume Control Tank 76. The full flow will be routed via the ultrasonic subsystem 8 and the system is built in as a fixed system part. This application is suited for example for older German or French fleet plants comprising hydrogenation inside the Volume Control Tank 76. A retrofitting of piping seems not necessary, the main flow will be sprayed via the vessel head into a stripping gas flow. However, for this case it seems likely that the concentration of stripping gas in the primary coolant rises considerably. As a logical consequence it is assumed to backfit the separation vessel 16 with an additional connection below the fluid surface in the vessel in order to minimize such effects.

Figure 4:
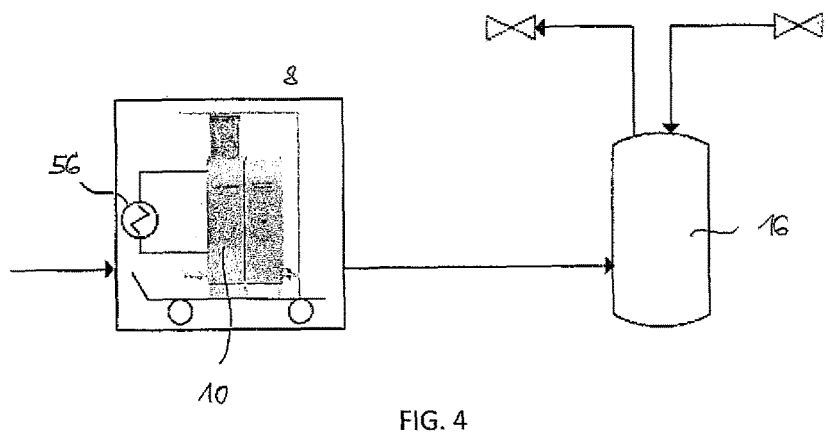
FIG. 4 shows a third concrete application of the degasification system according to FIG. 1, in this case a mobile application.

FIG. 4 shows a third concrete application of the above-described concept within a nuclear power plant, in which a mobile version of the ultrasonic subsystem 8 is used on demand. The application is meant to work in the same manner as the one in FIG. 3 beside the fact that the equipment can easily be connected and disconnected at will.

While the above description has been focused on applications in the nuclear sector, the proposed degasification system and the according method or process may also be employed in conventional (non-nuclear) power plants or industrial plants wherever it is necessary to degasify a liquid. In particular, the mobile application of FIG. 4 is instantly suited for such applications as well, without major modifications.

LIST OF REFERENCE NUMERALS 2 degasification system
4 liquid inflow
6 supply line
8 ultrasonic subsystem
10 sonotrode
11 sonotrode cluster
12 branch line
14 flow-through cell
16 separation vessel
18 collecting line
20 connecting line
22 separation subsystem
23 liquid
24 filling level
26 gas space
28 suction line
30 surface
31 gas flow
32 discharge line
34 liquid outflow
36 inlet opening
38 outlet opening
40 purging gas flow
42 purging gas line
44 control valve
46 cooling line
48 coolant inlet
50 coolant inflow
52 coolant outlet
54 coolant outflow
56 sonotrode cooling system
58 flow cooling system
60 housing
62 transport roller
70 Reactor Chemical and Volume Control System (CVCS)
72 letdown line
74 charging pump
76 Volume Control Tank (VCT)
78 line branching
80 line branching
90 primary reactor coolant circuit
92 Reactor Pressure Vessel (RPV)
94 pressurizer
96 steam generator
98 primary coolant pump

The invention claimed is:

1. A nuclear power plant comprising:
a nuclear reactor;
a reactor coolant circuit;
a degasification system for a reactor coolant circulating in the reactor coolant circuit, the degasification system being an ultrasonic degasification system comprising a sonotrode cluster with at least one sonotrode arranged in a line of the reactor coolant circuit or in a line which is fluidically connected to the reactor coolant circuit; and
a separation vessel downstream to the sonotrode cluster.

2. The nuclear power plant according to claim 1, wherein the sonotrode cluster comprises a plurality of sonotrodes in parallel-flow configuration.

3. The nuclear power plant according to claim 2, wherein a number of flown-through sonotrodes is adjustable by according control valves.

4. The nuclear power plant according to claim 1, wherein each sonotrode is arranged within a flow-through cell.

5. The nuclear power plant according to claim 1, wherein the separation vessel comprises a gas space to which a suction line for an extracted gas flow is connected.

6. The nuclear power plant according to claim 1, further comprising a sonotrode cooling system.

7. The nuclear power plant according to claim 1, further comprising a flow cooling system for a reactor coolant flow leaving the sonotrodes.

8. The nuclear power plant according to claim 1, wherein the sonotrode cluster is a mobile device.

9. The nuclear power plant according to claim 1, wherein the nuclear reactor is a Pressurized Water Reactor or a CANDU reactor with a primary reactor coolant circuit and a secondary reactor coolant circuit, and wherein the reactor coolant to be degassed is a primary reactor coolant of the primary reactor coolant circuit.

10. The nuclear power plant according to claim 9, further comprising a Reactor Chemical and Volume Control System with a letdown line and a Volume Control Tank, and wherein a supply line leads from the letdown line to the sonotrode cluster.

11. The nuclear power plant according to claim 10, wherein the Volume Control Tank is arranged to act as a separation vessel for a flow of primary reactor coolant leaving the sonotrode cluster.

12. The nuclear power plant according to claim 1, wherein the nuclear reactor is a Pressurized Water Reactor or a CANDU reactor with a primary reactor coolant circuit and a secondary reactor coolant circuit, and wherein the reactor coolant to be degassed is a secondary reactor coolant of the secondary reactor coolant circuit.

13. A method for degassing a flow of reactor coolant of a nuclear reactor, the method comprising the following steps:
(a) applying ultrasonic vibrations to the flow by at least one sonotrode, and then
(b) guiding the flow into a separation vessel,
wherein a flow of gas is separated from a liquid phase; and
wherein the separation vessel is downstream to the sonotrode cluster.

14. The method according to claim 13, wherein the steps (a) and (b) are executed continuously.

* * * * *